United States Patent  (10) Patent No.: US 7,812,954 B2
Sekine et al.  (45) Date of Patent: Oct. 12, 2010

(54) INFORMATION PROCESSING APPARATUS AND METHOD OF SELECTING TYPE OF AMBIENT LIGHT THEREFOR

(75) Inventors: Hisato Sekine, Yokohama (JP); Takahiro Suzuki, Tokyo (JP); Yukinobu Akado, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 12/109,209

(22) Filed: Apr. 24, 2008

(65) Prior Publication Data

US 2008/0266554 A1  Oct. 30, 2008

(30) Foreign Application Priority Data

Apr. 26, 2007 (JP) ............................. 2007-117033

(51) Int. Cl.
G01J 3/30 (2006.01)
G01J 3/50 (2006.01)

(52) U.S. Cl. ................. 356/425; 250/214 AL; 356/300; 356/402

(58) Field of Classification Search ............ 250/214 AL
See application file for complete search history.

(56) References Cited

U.S. PATENT DOCUMENTS 5,248,880 A  9/1993  Fergason
6,373,531 B1  4/2002  Hidaka et al.
6,453,066 B1  9/2002  Shiraiwa et al.
6,822,695 B2  11/2004  Lee et al.
2003/0043299 A1  3/2003  Lee et al.
2005/0078122 A1  4/2005  Ohga
2005/0083293 A1*  4/2005  Dixon ....................... 345/102
2008/0179497 A1*  7/2008  Maniam et al. ........ 250/214 AL

FOREIGN PATENT DOCUMENTS

JP  2002-218266 A  8/2002
JP  2003-030646 A  1/2003
JP  2003-125060 A  4/2003
KR  10-1998-0072858 A  11/1998

* cited by examiner

*Primary Examiner*—F. L Evans
(74) *Attorney, Agent, or Firm*—Canon U.S.A., Inc. I.P. Division

(57) ABSTRACT

An information processing apparatus includes a unit configured to acquire spectral data of ambient light to be estimated, a unit configured to receive spectral data and ambient light type information of a plurality of reference ambient light conditions, a comparison unit configured to compare the spectral data of the ambient light to be estimated with the spectral data of the plurality of reference ambient light conditions, and an estimation unit configured to estimate an ambient light type of the spectral data of the ambient light to be estimated from the ambient light type information of the reference ambient light based on a result of comparison provided by the comparison unit.

11 Claims, 6 Drawing Sheets

FIG.5

| | | |
|---|---|---|
| AMBIENT LIGHT TYPE | BROAD-BAND TYPE | A, C, D50, D65, F7~F9 |
| | THREE-BAND TYPE | F10~F12 |
| | NORMAL TYPE | F1~F6 |
| | UNKNOWN | |

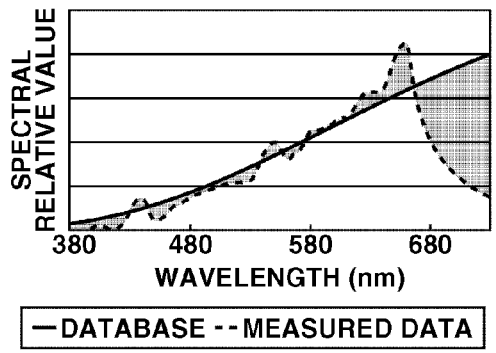

FIG.6A
COMPARISON BETWEEN
DATABASE AND MEASURED DATA
WITHOUT WEIGHTING FUNCTION

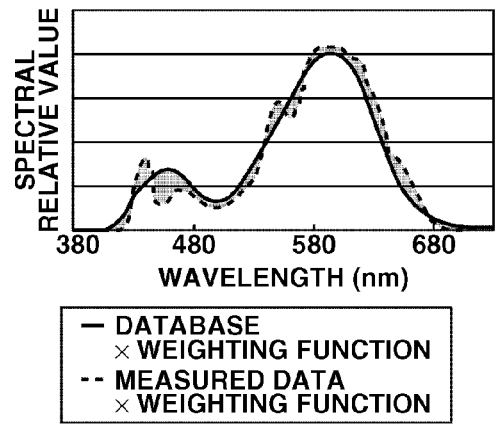

FIG.6C
COMPARISON BETWEEN
DATABASE AND MEASURED DATA
$w(\lambda) = x(\lambda) + y(\lambda) + z(\lambda)$

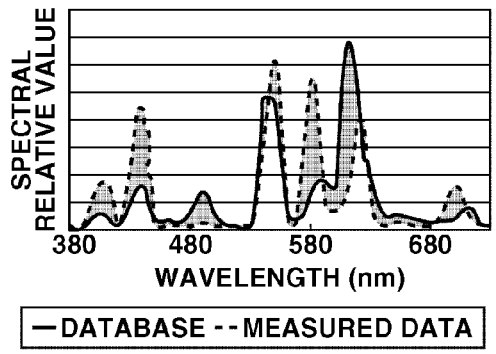

FIG.6B
COMPARISON BETWEEN
DATABASE AND MEASURED DATA
WITHOUT WEIGHTING FUNCTION

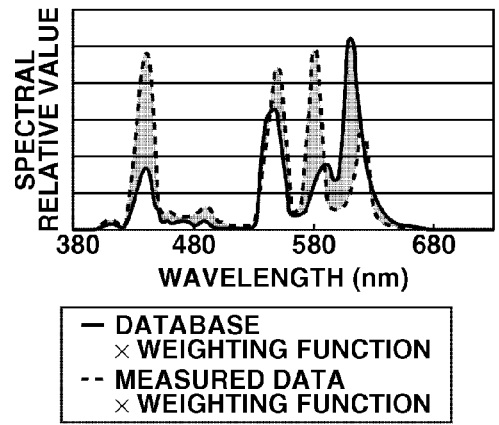

FIG.6D
COMPARISON BETWEEN
DATABASE AND MEASURED DATA
$w(\lambda) = x(\lambda) + y(\lambda) + z(\lambda)$

▓ SQUARED ERROR VALUE

INFORMATION PROCESSING APPARATUS AND METHOD OF SELECTING TYPE OF AMBIENT LIGHT THEREFOR

BACKGROUND OF THE INVENTION

1. Field of the Invention

The present invention relates to an information processing apparatus capable of estimating a type of ambient light.

2. Description of the Related Art

A calorimetric color reproduction-based color reproduction technique is generally used to perform color matching between different output devices (e.g., a monitor and a printer). The calorimetric color reproduction includes obtaining XYZ tristimulus values of colors output from each output device, then obtaining CIE-L*a*b* values, and finally performing color reproduction to accord L*a*b* values of colors output from respective output devices with the obtained CIE-L*a*b* values.

If the output device is a monitor or another self-luminescent device, the formula (1) shown below can be used to obtain XYZ tristimulus values of colors. On the other hand, a printed product reproduces colors by reflecting light in a viewing condition (hereinafter referred to as "ambient light"). Formula (2) can be used to obtain XYZ tristimulus values of colors in a printed product. Furthermore, formula (3) can be used to obtain CIE-L*a*b* values from XYZ tristimulus values.

As apparent from formula (2), if the ambient light for viewing a printed product is changed, the XYZ tristimulus values change correspondingly and, as a result, the CIE-L*a*b* values change. Therefore, in performing color matching between different devices (e.g., a monitor and a printer), the type of ambient light used for viewing a printed product is significant. In general, the color matching is performed by calculating XYZ tristimulus values under the reference light of sunlight D50 having a CIE (Commission Internationale de l'Éclairage)-regulated color temperature equivalent to 5000K.

$$X = k \int_{vis} P(\lambda) \cdot \bar{x}(\lambda) \cdot d\lambda$$

$$Y = k \int_{vis} P(\lambda) \cdot \bar{y}(\lambda) \cdot d\lambda$$

$$Z = k \int_{vis} P(\lambda) \cdot \bar{z}(\lambda) \cdot d\lambda$$

$$k = 683.0 \quad (1)$$

In formula (1), $P(\lambda)$ represents a spectral radiance of illuminant color, and $\bar{x}(\lambda)$, $\bar{y}(\lambda)$, and $\bar{z}(\lambda)$ represent color matching functions.

$$X = k \int_{vis} R(\lambda) \cdot P(\lambda) \cdot \bar{x}(\lambda) \cdot d\lambda \quad (2)$$

$$Y = k \int_{vis} R(\lambda) \cdot P(\lambda) \cdot \bar{y}(\lambda) \cdot d\lambda$$

$$Z = k \int_{vis} R(\lambda) \cdot P(\lambda) \cdot \bar{z}(\lambda) \cdot d\lambda$$

$$k = \frac{100}{\int_{vis} P(\lambda) \cdot \bar{y}(\lambda) \cdot d\lambda}$$

In formula (2), $R(\lambda)$ represents a spectral reflectance of object color, $P(\lambda)$ represents a spectral radiance of illuminant color, and $\bar{x}(\lambda)$, $\bar{y}(\lambda)$, and $\bar{z}(\lambda)$ represent color matching functions.

$$L^* = 116 * f\left(\frac{Y}{Y_n}\right) - 16 \quad (3)$$

$$a^* = 500 * \left\{f\left(\frac{X}{X_n}\right) - f\left(\frac{Y}{Y_n}\right)\right\}$$

$$b^* = 200 * \left\{f\left(\frac{Y}{Y_n}\right) - f\left(\frac{Z}{Z_n}\right)\right\}$$

In formula (3), Xn, Yn, and Zn represent X, Y, and Z values of a white point.

$$f\left(\frac{X}{X_n}\right) = \begin{cases} \left(\frac{X}{X_n}\right)^{\frac{1}{3}}, & \text{when } \frac{X}{X_n} > 0.008856 \\ 7.787\left(\frac{X}{X_n}\right) + \frac{16}{116}, & \text{when } \frac{X}{X_n} \leq 0.008856 \end{cases}$$

$$f\left(\frac{Y}{Y_n}\right) = \begin{cases} \left(\frac{Y}{Y_n}\right)^{\frac{1}{3}}, & \text{when } \frac{Y}{Y_n} > 0.008856 \\ 7.787\left(\frac{Y}{Y_n}\right) + \frac{16}{116}, & \text{when } \frac{Y}{Y_n} \leq 0.008856 \end{cases}$$

$$f\left(\frac{Z}{Z_n}\right) = \begin{cases} \left(\frac{Z}{Z_n}\right)^{\frac{1}{3}}, & \text{when } \frac{Z}{Z_n} > 0.008856 \\ 7.787\left(\frac{Z}{Z_n}\right) + \frac{16}{116}, & \text{when } \frac{Z}{Z_n} \leq 0.008856 \end{cases}$$

However, color matching needs to be performed under various types of ambient light. Therefore, the color matching requires information about various ambient light conditions and XYZ tristimulus values obtained under each ambient light condition.

A conventional method discussed in Japanese Patent Application Laid-Open No. 2002-218266 includes measuring spectral data of ambient light with a spectral illuminometer and obtaining XYZ tristimulus values of object color under the ambient light based on spectral data of the object color and spectral data of the ambient light according to formula (2).

The method discussed in Japanese Patent Application Laid-Open No. 2002-218266 can obtain spectral data of ambient light and, accordingly, can accurately perform color matching. Furthermore, the method discussed in Japanese Patent Application Laid-Open No. 2002-218266 can hold spectral data of the object color and, therefore, can perform calculation using the spectral data.

However, if a user is required to store spectral data of object color, the volume of the spectral data is too large to process.

If sampling at intervals of 10 nm is applied to a visible light range of 380 nm to 730 nm, the spectral information of ambient light becomes a total of 36 pieces of data. Furthermore, generation of an accurate profile requires a great amount of data for several hundreds of object colors. It is therefore difficult to manage the spectral data for both the ambient light information and object colors.

On the other hand, if the color matching is performed based on only the XYZ tristimulus values of ambient light measured as ambient light information, the matching accuracy may deteriorate because the spectral data may differ even if the same XYZ tristimulus values of the ambient light are derived from formula (1). For example, fluorescent lamps are generally classified into three types: broad-band type, three-band type, and normal type. These fluorescent lamps are different in spectral data and color characteristics even if they have the same XYZ tristimulus values.

As described above, if the ambient light information used in the color matching processing is spectral data, there is a problem of too much data. If the ambient light information is XYZ tristimulus values, there is a problem of lack of accuracy.

SUMMARY OF THE INVENTION

Exemplary embodiments of the present invention are directed to an information processing apparatus capable of using a type of ambient light as ambient light information and realizing information that is appropriately accurate and easy to handle. Furthermore, exemplary embodiments of the present invention are directed to an information processing apparatus capable of accurately estimating a type of ambient light based on spectral data of the ambient light.

According to an aspect of the present invention, an information processing apparatus includes a unit configured to acquire spectral data of ambient light to be estimated, a unit configured to receive spectral data and ambient light type information of a plurality of reference ambient light conditions, a comparison unit configured to compare the spectral data of the ambient light to be estimated with the spectral data of the plurality of reference ambient light conditions, and an estimation unit configured to estimate an ambient light type of the spectral data of the ambient light to be estimated from the ambient light type information of the reference ambient light based on a result of comparison provided by the comparison unit.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments and features of the invention and, together with the description, serve to explain at least some of the principles of the invention.

FIG. 5 illustrates some examples of the ambient light type.

FIGS. 6A through 6D are graphs illustrating example effects according to a weighting function.

DETAILED DESCRIPTION OF THE EMBODIMENTS

Figure 1:
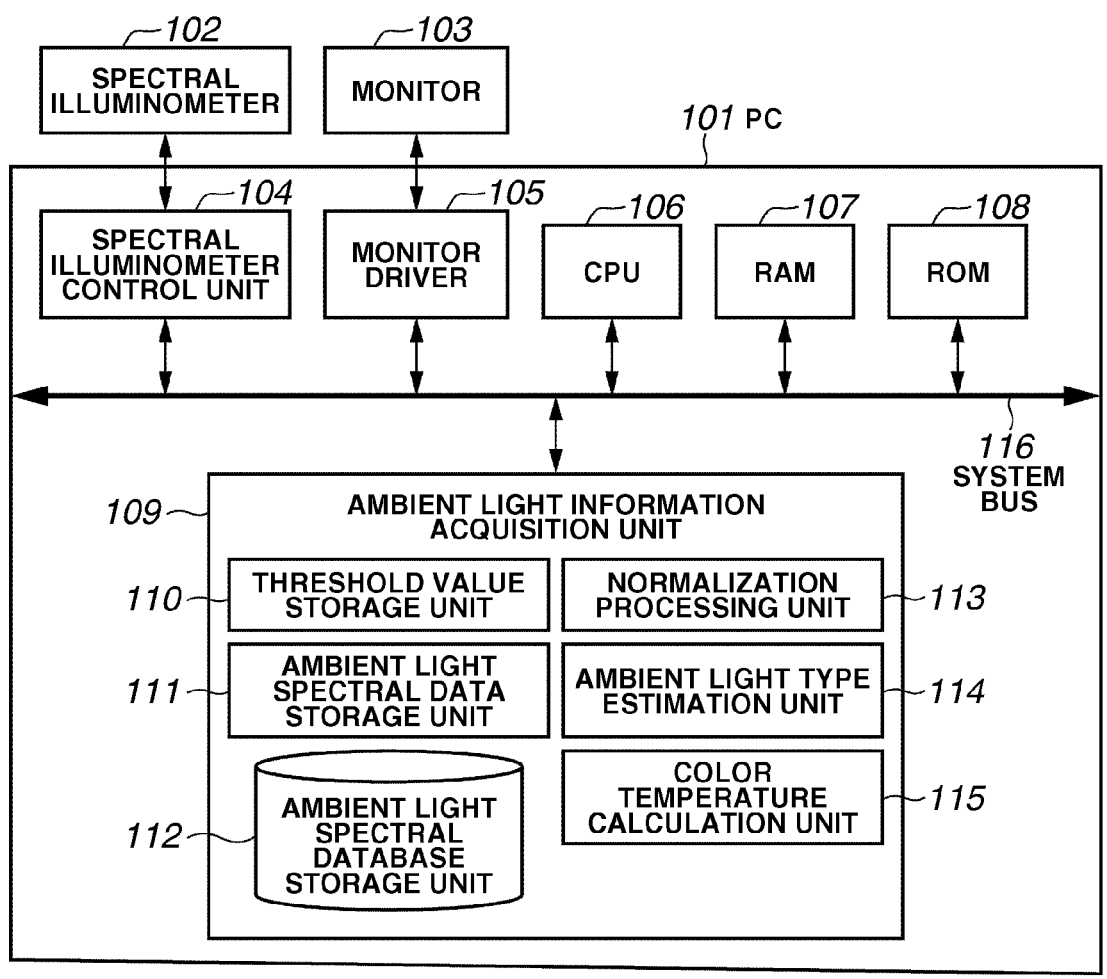
FIG. 1 is a block diagram illustrating a configuration of an information processing system according to an exemplary embodiment of the present invention.

The following description of exemplary embodiments is illustrative in nature and is in no way intended to limit the invention, its application, or uses. Processes, techniques, apparatus, and systems as known by one of ordinary skill in the art are intended to be part of the enabling description where appropriate. It is noted that throughout the specification, similar reference numerals and letters refer to similar items in the following figures, and thus once an item is described in one figure, it need not be discussed for following figures. Exemplary embodiments will be described in detail below with reference to the drawings.

FIG. 1 is a block diagram illustrating a configuration of an information processing system according to an exemplary embodiment of the present invention.

The information processing system according to FIG. 1 includes a spectral illuminometer 102 that measures ambient light used to view a printed product and a monitor 103 that displays estimated ambient light information based on a measurement result. A personal computer (PC) 101 estimates ambient light information based on spectral data of ambient light measured by the spectral illuminometer 102. The PC 101 causes the monitor 103 to display the estimated ambient light information to inform a user.

The ambient light information according to an exemplary embodiment is a combination of ambient light type and color temperature. The information processing system includes the PC 101, the spectral illuminometer 102, and the monitor 103. A spectral illuminometer control unit 104 controls the spectral illuminometer 102 and acquires spectral data of ambient light. A monitor driver 105 controls the monitor 103 to display a user interface and ambient light information. A central processing unit (CPU) 106 controls operations performed by the PC 101. A random access memory (RAM) 107 temporarily stores programs and data supplied from an external apparatus. A read-only memory (ROM) 108 stores programs and parameters, which are not required to be changed. A system bus 116 enables the above-described units 104 through 115 to communicate with one another.

An ambient light information acquisition unit 109 estimates ambient light based on spectral data of the ambient light measured by the spectral illuminometer 102 via the spectral illuminometer control unit 104. A threshold value storage unit 110 stores one or more threshold values used for the ambient light estimation. An ambient light spectral data storage unit 111 stores spectral data of the ambient light measured by the spectral illuminometer 102.

An ambient light spectral database storage unit 112 stores spectral data and ambient light type information of a plurality of representative ambient light conditions. The representative ambient light conditions are reference ambient lights. The spectral data of the plurality of representative ambient light conditions stored in the ambient light spectral database storage unit 112 can be used as reference data in estimating ambient light information of spectral data of the ambient light stored in the ambient light spectral data storage unit 111.

A normalization processing unit 113 performs normalization processing. An ambient light type estimation unit 114 estimates an ambient light type of spectral data of the ambient light stored in the ambient light spectral data storage unit 111. A color temperature calculation unit 115 calculates a spectral data color temperature of the ambient light stored in the ambient light spectral data storage unit 111.

Figure 2:
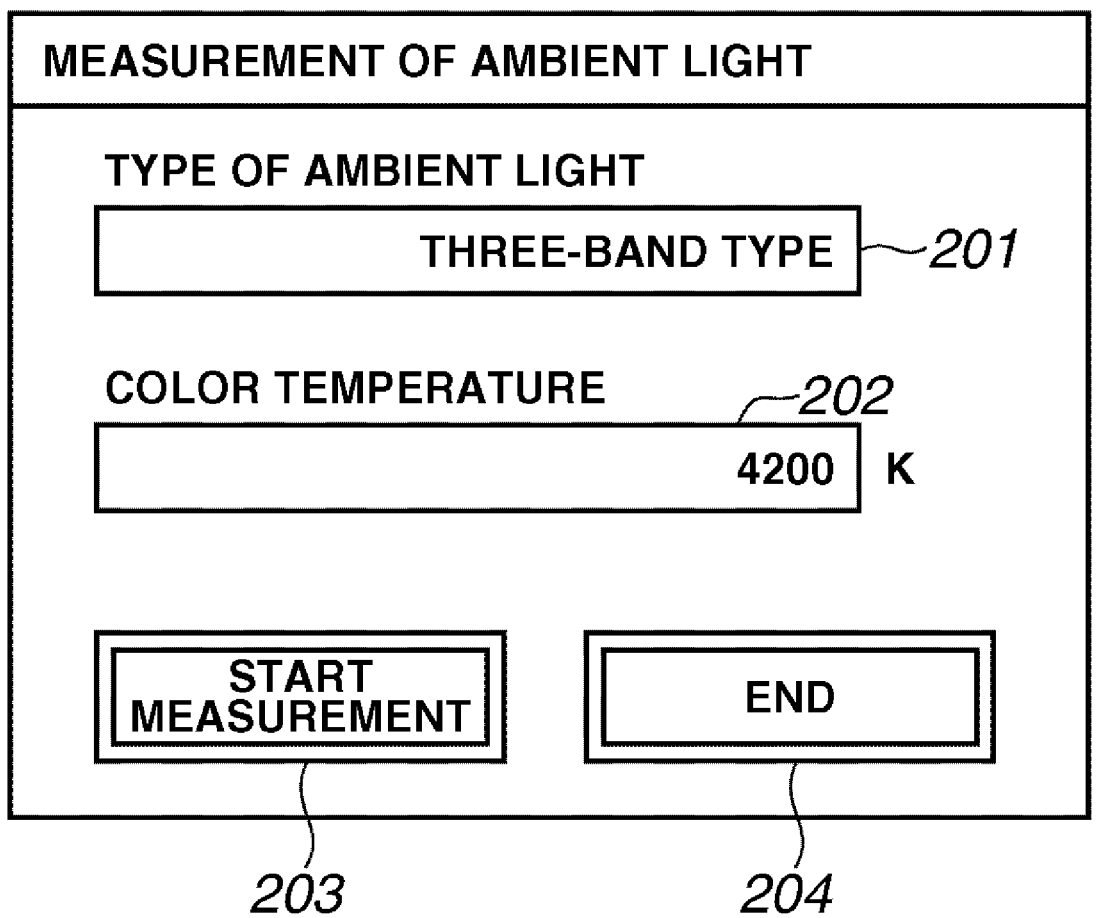
FIG. 2 illustrates an example user interface.

FIG. 2 illustrates an example user interface that can be displayed on the monitor 103.

The user interface illustrated in FIG. 2 includes an ambient light type display field 201 that displays the type of ambient light and a color temperature display field 202 that displays a color temperature of the ambient light.

In an exemplary embodiment, the ambient light information is a combination of ambient light type and color temperature. Therefore, as a result of ambient light estimation, the ambient light type display field 201 displays the ambient light type and the color temperature display field 202 displays the color temperature.

A measurement start button 203 allows a user to instruct the spectral illuminometer control unit 104 to measure ambient light via the spectral illuminometer 102. An end button 204 enables a user to stop the ambient light estimation processing.

Figure 3:
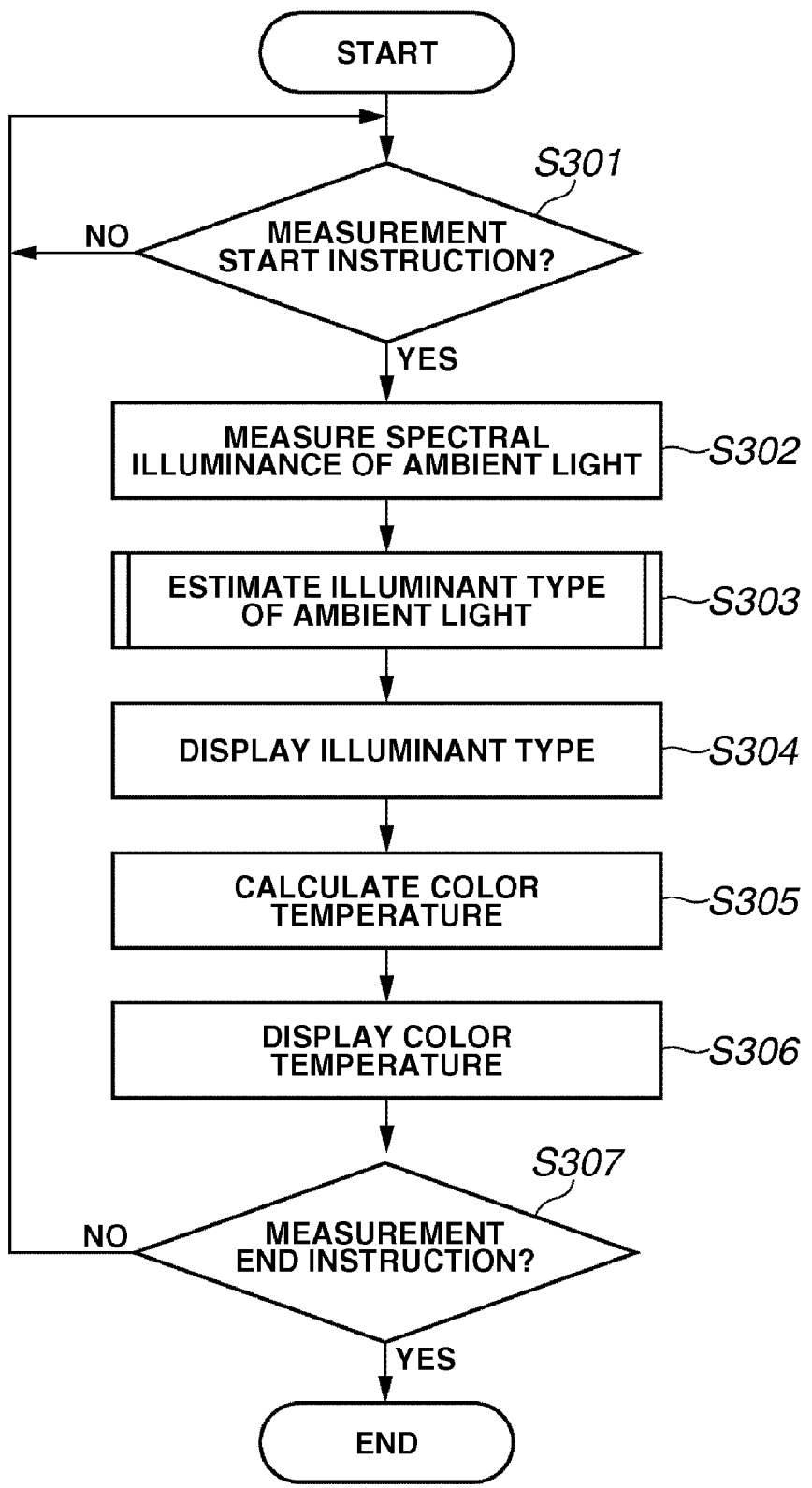
FIG. 3 is a flowchart illustrating an ambient light information acquiring method according to an exemplary embodiment of the present invention.

FIG. 3 is a flowchart illustrating example ambient light type estimation processing according to an exemplary embodiment of the present invention.

In step S301, the CPU 106 determines whether a user has pressed the measurement start button 203. If the CPU 106 determines that the measurement start button 203 is pressed (YES in step S301), the processing proceeds to step S302. If the CPU 106 determines that the measurement start button 203 is not pressed (NO in step S301), the CPU 106 repeats the processing of step S301.

In step S302, the CPU 106 measures spectral data of the ambient light. The CPU 106 instructs the spectral illuminometer control unit 104 to measure the ambient light via the spectral illuminometer 102. Then, the CPU 106 stores the spectral data of the measured ambient light in the ambient light spectral data storage unit 111.

In step S303, the CPU 106 causes the ambient light type estimation unit 114 to estimate the illuminant type (ambient light type) of ambient light corresponding to the spectral data stored in the ambient light spectral data storage unit 111.

In step S304, the CPU 106 causes the monitor driver 105 to display the illuminant type of ambient light estimated in step S303 in the ambient light type display field 201 of the user interface.

In step S305, the CPU 106 causes the color temperature calculation unit 115 to calculate a color temperature of ambient light corresponding to the spectral data stored in the ambient light spectral data storage unit 111.

In step S306, the CPU 106 causes the monitor driver 105 to display the color temperature calculated in step S305 in the color temperature display field 202 of the user interface.

In step S307, the CPU 106 determines whether a user has pressed the end button 204. If the CPU 106 determines that the end button is pressed, the CPU 106 terminates this processing routine. If the CPU 106 determines that the end button is not pressed (NO in step S307), the processing returns to step S301. If the CPU 106 determines that the end button is pressed (YES in step S307), the processing ends.

Figure 4:
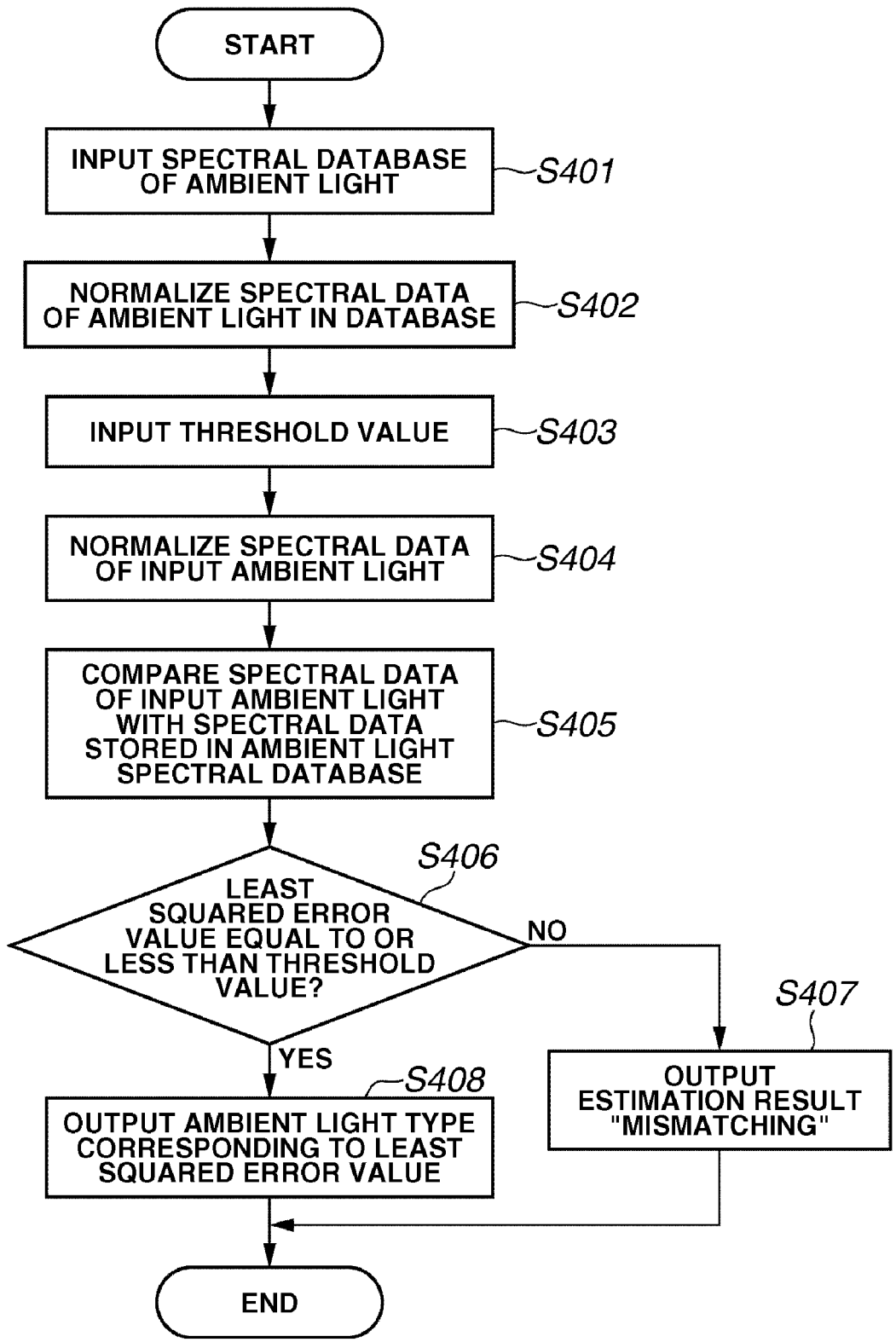
FIG. 4 is a flowchart illustrating example processing performed by an ambient light type estimation unit.

Example processing for estimating the illuminant type of ambient light performed in step S303 is described below in detail with reference to the flowchart illustrated in FIG. 4.

In step S401, the CPU 106 inputs data from a spectral database of ambient light while associating spectral data of arbitrary ambient light with ambient light type information.

The ambient light spectral database according to an exemplary embodiment stores spectral data of CIE-regulated illumination (A, D50, D65, C, and F1 to F12). Furthermore, an exemplary embodiment classifies the ambient light type into four types of "broad-band type", "three-band type", "normal type", and "unknown" as illustrated in FIG. 5. The classification of the ambient light type is based on the characteristic shape of the spectral data. The CIE-regulated illumination (A, D50, D65, C, and F1 to F12) according to an exemplary embodiment can be classified into three types of "broad-band type", "three-band type", and "normal type."

In step S402, the CPU 106 normalizes each type of spectral data of ambient light stored in the ambient light spectral database storage unit 112 according to the following formula (4).

$$k \int_{380}^{730} r(\lambda)V(\lambda)d\lambda = 100 \quad (4)$$

In formula (4), r(λ) represents spectral data stored in the database, V(λ) represents standard luminous efficiency, and k represents a normalization factor.

In step S403, the CPU 106 inputs a threshold value from the ROM 108 and stores the input threshold value in the threshold value storage unit 110.

In step S404, the CPU 106 normalizes the spectral data of ambient light stored in the ambient light spectral data storage unit 111 according to the following formula (5).

$$k \int_{380}^{730} s(\lambda)V(\lambda)d\lambda = 100 \quad (5)$$

In formula (5), s(λ) represents measured spectral data, V(λ) represents standard luminous efficiency, and k represents a normalization factor.

In an exemplary embodiment, the CPU 106 compares spectral data of a plurality of representative ambient light conditions stored in the ambient light spectral database with spectral data of the ambient light measured by the spectral illuminometer 102, with respect to the shape of spectral data. To perform an accurate comparison of shapes, it is necessary to use the same relative values in comparison. Hence, in an exemplary embodiment, the CPU 106 performs normalization to equalize the brightness between the compared ambient lights. The brightness is an important parameter for ambient light.

In an exemplary embodiment, the CPU 106 compares the spectral data stored in the ambient light spectral database with spectral data of measured ambient light using the formulas (4) and (5), with respect to the relative spectral radiant intensity.

In step S405, the CPU 106 compares spectral data of measured ambient light to be estimated stored in the ambient light spectral data storage unit 111 with each spectral data type stored in the ambient light spectral database. In an exemplary embodiment, the CPU 106 calculates a squared error value between the spectral data of ambient light to be estimated and each type of spectral data stored in the ambient light spectral database. Then, the CPU 106 selects a least squared error value that is a minimum value among the plurality of squared error values calculated. An exemplary method for calculating a squared error value is described later.

In step S406, the CPU 106 determines whether the least squared error value calculated in step S405 is equal to or less than a threshold value stored in the threshold value storage unit 110. If the CPU 106 determines that the least squared error value is equal to or less than the threshold value (YES in step S406), the processing proceeds to step S408. If the CPU 106 determines that the least squared error value is greater than the threshold value (NO in step S406), the processing proceeds to step S407.

In step S407, the CPU 106 outputs an estimation result "mismatching."

The actual viewing conditions include various types of ambient lights. For example, a possible viewing condition is a mixed illuminant of solar light (broad-band type) and a fluorescent lamp (three-band type). If such an illuminant is used, the illuminant is greatly different in shape from the ambient lights stored in the ambient light spectral database. According to an exemplary embodiment, in such a case, the CPU 106 determines that the estimation result is mismatching and notifies a user of a failure to identify the type of ambient light. Thus, in the color matching processing according to ambient light information, an exemplary embodiment can prevent the color processing based on inappropriate ambient light information from being performed.

In step S408, the CPU 106 outputs an ambient light type corresponding to the least squared error value.

In the above-described exemplary embodiment, the CPU 106 performs the normalization processing in steps S402 and S404 to equalize the relative spectral radiant intensity. Therefore, the CPU 106 can accurately compare the shapes of compared spectral data. The shape of spectral data varies depending on the type of ambient light. Therefore, an exemplary embodiment can accurately identify the type of ambient light.

An exemplary method for calculating a squared error value in step S405 is described below in detail. The CPU 106 obtains weighted squared errors between the spectral data of the ambient light normalized in step S404 and the spectral data of each type of ambient light in the ambient light spectral database normalized in step S402, using the following error value formula (6).

$$err_i = \int_{380}^{730} w_i(\lambda)(R_i(\lambda) - S(\lambda))^2 \, d\lambda \tag{6}$$

In formula (6), $R_i(\lambda)$ represents i-th ambient light spectral data stored in the ambient light spectral database, $S(\lambda)$ represents measured ambient light spectral data, and $w(\lambda)$ represents a weighting function.

In an exemplary embodiment, the CPU 106 uses a weighting function corresponding to color matching functions as defined in the following formula (7).

$$w(\lambda) = \bar{x}(\lambda) + \bar{y}(\lambda) + \bar{z}(\lambda) \tag{7}$$

In formula (7), $\bar{x}(\lambda)$, $\bar{y}(\lambda)$, and $\bar{z}(\lambda)$ represent color matching functions.

Using the weighting function corresponding to the color matching functions is effective to accurately estimate the type of ambient light.

FIGS. 6A through 6D are graphs illustrating example effects according to the weighting function corresponding to the color matching functions expressed by formula (7). FIGS. 6A and 6B illustrate squared error values obtained without using any weighting function. FIGS. 6C and 6D illustrate squared error values obtained when the weighting function expressed by formula (7) is used.

In FIGS. 6A through 6D, the solid line indicates spectral data that has a minimum squared error value among the spectral data of a plurality of ambient light types illustrated in FIG. 5 and stored in the ambient light spectral database. The dotted line indicates spectral data of measured ambient light. The halftone area indicates a squared error value.

FIGS. 6A and 6C illustrate measurement data of a fluorescent lamp whose bulb color is broad-band type. FIGS. 6B and 6D illustrate measurement data of a mercury vapor lamp. According to the measurement data illustrated in FIG. 6A, the error becomes very large if the wavelength is equal to or greater than 680 nm. Therefore, squared error values are similar between FIGS. 6A and 6B. If the measured ambient light is a mercury vapor lamp, which may not be predicted, the color matching accuracy greatly deteriorates. Therefore, it is desired to determine that the estimation result is mismatching. However, as illustrated in FIGS. 6A and 6B, even if the fluorescent lamp is a broad-band type, the squared error values are similar between the fluorescent lamp and the mercury vapor lamp.

Accordingly, if a threshold value is set such that it is determined that the squared error value in FIG. 6A is equal to or less than the threshold value, the squared error value in FIG. 6B also becomes equal to or less than the threshold value. The example illustrated in FIG. 6B may thus be erroneously determined as "matched" although it is desired to evaluate it as "mismatching." Thus, a method not relying on any weighting function deteriorates the accuracy in estimating the ambient light type.

On the other hand, if the weighting function corresponding to the color matching functions defined by formula (7) is used, the squared error value can be reduced as illustrated in FIG. 6C. Meanwhile, in the case of using the mercury vapor lamp, the squared error value does not decrease so much, as illustrated in FIG. 6D. Therefore, setting the threshold value with reference to the example illustrated in FIG. 6C enables accurately determining the estimation result as "mismatching" if the ambient light is a mercury vapor lamp or other non-predicted illuminant.

This is because the design parameters of fluorescent lamps include chromaticity points according to color matching functions. In general, fluorescent lamps are designed to have excellent characteristics in a region of the color matching function where the spectral sensitivity is high. For the above-described reason, the color matching function is very effective as a weighting function. Thus, an exemplary embodiment using the weighting function corresponding to the color matching function can greatly improve the accuracy in estimation of the ambient light type.

An example calculation of the color temperature in step S305 of FIG. 3 is described below in detail.

In an exemplary embodiment, the CPU 106 calculates the color temperature T using the following formula (8).

$$T = -437 \times n^3 + 3601 \times n^2 - 6861 \times n + 5514.31 \tag{8}$$

$$n = (x - 0.3320)/(y - 0.1858)$$

$$x = X/(X + Y + Z)$$

$$y = Y/(X + Y + Z)$$

$$X = K \int_{vis} P(\lambda) \cdot \bar{x}(\lambda) \, d\lambda$$

$$Y = K \int_{vis} P(\lambda) \cdot \bar{y}(\lambda) \, d\lambda$$

$$Z = K \int_{vis} P(\lambda) \cdot \bar{z}(\lambda) \, d\lambda$$

In formula (8), K=683, $P(\lambda)$ represents spectral illuminance of ambient light, and $\bar{x}(\lambda)$, $\bar{y}(\lambda)$, and $\bar{z}(\lambda)$ represent color matching functions.

As described above, in an exemplary embodiment, the CPU 106 calculates the color temperature based on the spectral data of measured ambient light without referring to any ambient light spectral database.

Thus, an exemplary embodiment can calculate the color temperature according to the measured ambient light regardless of limited color temperature information of ambient light stored in the ambient light spectral database.

An exemplary embodiment estimates the ambient light type using the ambient light spectral database and, then, calculates the color temperature of ambient light. As a result, an exemplary embodiment can accurately estimate information of ambient light that is similar in type with the ambient light stored in the ambient light spectral database but different in color temperature. For example, the ambient light spectral database includes broad-band type s 6500K, 5000K, and 4000K. Even if the measured ambient light is the broad-band type 5500K, an exemplary embodiment can accurately estimate the ambient light type (broad-band type) and the color temperature (5500K) as ambient light information.

As described above, an exemplary embodiment uses the ambient light database to accurately determine the ambient light type based on the shape of the measured spectral data. If the ambient light type cannot be estimated because the ambient light database does not store a corresponding type, an exemplary embodiment determines that the estimation result is "mismatching" and notifies a user of the estimation result.

On the other hand, an exemplary embodiment accurately calculates the color temperature based on spectral data of measured ambient light according to formula (8) without using any spectral database. Thus, an exemplary embodiment can also accurately estimate any color temperature not stored in the ambient light database.

The ambient light database used in the above-described exemplary embodiment is the CIE-regulated illumination spectral data. However, any other spectral data can be used. For example, an example ambient light spectral database can store spectral data actually measured via a spectral illuminometer.

The example ambient light types illustrated in FIG. 5 can be replaced with any other ambient light types. For example, other example ambient light types include solar light, bulb color, and mercury vapor lamp.

The measuring device of ambient light is not limited to a spectral illuminometer and can be a type capable of measuring spectral radiance data.

In the above-described exemplary embodiment, the CPU 106 normalizes the spectral data stored in the ambient light database (step S402). However, the spectral database can store normalized spectral data beforehand. In this case, the CPU 106 can skip the processing of step S402.

Furthermore, software program code for realizing the functions of the above-described exemplary embodiments can be supplied to a system or an apparatus including various devices. A computer (or CPU or micro-processing unit (MPU)) in the system or the apparatus can execute the program to operate the devices to realize the functions of the above-described exemplary embodiments. Accordingly, the present invention encompasses the program code installable on a computer when the functions or processes of the exemplary embodiments can be realized by the computer. In this case, the program code itself can realize the functions of the exemplary embodiments. The equivalents of programs can be used if they possess comparable functions. In this case, the type of program can be any one of object code, interpreter program, and OS script data.

Furthermore, the present invention encompasses supplying program code to a computer with a storage (or recording) medium storing the program code. A storage medium supplying the program can be selected from any one of a floppy disk, a hard disk, an optical disk, a magneto-optical (MO) disk, a compact disk-ROM (CD-ROM), a CD-recordable (CD-R), a CD-rewritable (CD-RW), a magnetic tape, a nonvolatile memory card, a ROM, and a DVD (DVD-ROM, DVD-R).

Moreover, an operating system (OS) or other application software running on a computer can execute part or the whole of actual processing based on instructions of the programs.

Additionally, the program code read out of a storage medium can be written into a memory of a function expansion board equipped in a computer or into a memory of a function expansion unit connected to the computer. In this case, based on an instruction of the program, a CPU provided on the function expansion board or the function expansion unit can execute part or the whole of the processing so that the functions of the above-described exemplary embodiments can be realized.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2007-117033 filed Apr. 26, 2007, which is hereby incorporated by reference herein in its entirety.

What is claimed is:

1. An information processing apparatus, comprising:
an acquiring unit configured to acquire input spectral data of input ambient light;
an input unit configured to input information corresponding to a plurality of reference light types, the information comprising reference spectral data and reference ambient light type data for each of the plurality of reference light types;
a calculation unit configured to calculate errors between the input spectral data of the input ambient light and the reference spectral data of each of the plurality of reference light types, said errors being calculated using a weighting function corresponding to a color matching function; and
a selection unit configured to select input ambient light type data of the input ambient light from the reference ambient light type data corresponding to at least one of the plurality of reference light types based on the errors calculated by the calculation unit.

2. The information processing apparatus according to claim 1, further comprising a normalization unit configured to normalize the input spectral data of the input ambient light, wherein the reference spectral data of the plurality of reference light types comprises normalized data.

3. The information processing apparatus according to claim 1, wherein the calculation unit calculates a squared error using said weighting function corresponding to a color matching function.

4. The information processing apparatus according to claim 1, wherein the calculation unit compares the error with a threshold value, determines whether the input ambient light matches at least one reference ambient light type of the plurality of reference light types based on the errors calculated by the calculation unit, and outputs a calculation result indicating mismatching if it is determined that the input ambient light does not match at least one reference ambient light type data of the plurality of reference light types.

5. The information processing apparatus according to claim 1, further comprising a computing unit configured to compute a color temperature from the input spectral data of the input ambient light.

6. A computer-readable storage medium storing a program that enables a computer to implement the information processing apparatus according to claim 1.

7. An information processing method for causing an information processing apparatus to select ambient light type data based on a plurality of reference light types, the method comprising:

acquiring input spectral data of input ambient light;

receiving reference spectral data and reference ambient light type data for each of the plurality of reference light types;

calculating errors between the input spectral data of the input ambient light and the reference spectral data of each of the plurality of reference light types, said errors being calculated using a weighting function corresponding to a color matching function; and selecting the input ambient light type data of the input ambient light from the reference ambient light type data coresponding to at least one of the plurality of reference light types based on the calculated errors, wherein at least one of said calculating step and selecting step is performed by a central processing unit operatively connected to the information processing apparatus.

8. An information processing apparatus, comprising:

an acquiring unit configured to acquire input spectral data of input ambient light;

a normalization unit configured to normalize the input spectral data such that a cumulative sum of a product of the input spectral data and a function of luminance efficiency of the input ambient light over a predetermined wavelength range is constant;

an input unit configured to input information corresponding to a plurality of reference light types, the information comprising reference spectral data and reference ambient light type data; and a selection unit configured to select input ambient light type data of the input ambient light from the reference ambient light type data corresponding to at least one of the plurality of reference light types based on a comparison between the normalized input spectral data and the reference spectral data of each of the plurality of reference light types.

9. The information processing apparatus according to claim 8, wherein the normalization unit is configured to normalize the input spectral data such that an integral of the product of the input spectral data and luminance efficiency of the input ambient light over the predetermined wavelength range is constant.

10. The information processing apparatus according to claim 8, further comprising a calculation unit configured to calculate errors using a weighting function corresponding to a color matching function between the input spectral data of the input ambient light and the reference spectral data of each of the plurality of reference light types; and wherein the selection unit selects the input ambient light type data of the input ambient light from the reference ambient light type data based on the errors calculated by the calculation unit.

11. An information processing method performed in an information processing apparatus, the method comprising:

an acquiring step of acquiring input spectral data of input ambient light;

a normalization step of normalizing the input spectral data such that a cumulative sum of a product of the input spectral data and a function of luminance efficiency of the input ambient light over a predetermined wavelength range is constant;

an input step of inputting information corresponding to a plurality of reference light types, the information comprising reference spectral data and reference ambient light type data for each of the plurality of reference light types; and a selection step of selecting, using the information processing apparatus, input ambient light type data of the input ambient light from the reference ambient light type data corresponding to at least one of the plurality of reference light types based on a comparison between the normalized input spectral data and the reference spectral data of each of the plurality of reference light types.

* * * * *